US 8,510,094 B2

(12) United States Patent
Chin et al.

(10) Patent No.: US 8,510,094 B2
(45) Date of Patent: *Aug. 13, 2013

(54) MACHINE TRANSLATION FEEDBACK

(75) Inventors: Jeffrey Chin, Medina, WA (US); Daniel Rosart, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,136

(22) Filed: Jul. 13, 2012

(65) Prior Publication Data

US 2012/0284013 A1  Nov. 8, 2012

Related U.S. Application Data

(63) Continuation of application No. 13/185,425, filed on Jul. 18, 2011, now Pat. No. 8,239,186, which is a continuation of application No. 11/675,034, filed on Feb. 14, 2007, now Pat. No. 7,983,897.

(51) Int. Cl.
*G06F 17/28* (2006.01)
(52) U.S. Cl.
USPC .................. 704/2; 704/9; 704/257; 704/251
(58) Field of Classification Search
USPC ............... 704/1–10, 277, 251, 255, 257, 270
See application file for complete search history.

(56) References Cited

U.S. PATENT DOCUMENTS

| 5,826,220 A * | 10/1998 | Takeda et al. .................. 704/7 |
|---|---|---|
| 6,418,403 B2 | 7/2002 | Fuji |
| 7,249,013 B2 | 7/2007 | Al-Onaizan et al. |
| 7,580,828 B2 | 8/2009 | D'Agostini |
| 7,657,420 B2 | 2/2010 | Maxwell, III |
| 2002/0198699 A1 | 12/2002 | Greene et al. |
| 2003/0009320 A1 | 1/2003 | Furuta |
| 2003/0200078 A1 | 10/2003 | Luo et al. |
| 2004/0260532 A1 | 12/2004 | Richardson et al. |
| 2005/0197826 A1 | 9/2005 | Neeman |
| 2005/0234700 A1 | 10/2005 | Li et al. |

FOREIGN PATENT DOCUMENTS

WO    2005086021 A2    9/2005

OTHER PUBLICATIONS

Alta Vista—Babel Fish Translation, ©2006, [online], Retrieved from the Internet: http://babelfish.altavista.com, 1 page.

(Continued)

*Primary Examiner* — Huyen X. Vo
(74) *Attorney, Agent, or Firm* — Remarck Law Group PLC

(57) ABSTRACT

Methods, program products and systems for first receiving an indication of when a user-manipulable cursor is positioned in proximity to a first presentation of first text in a graphical user interface (GUI), the first text being in a first language. In response to the first receiving, causing a second presentation in the GUI of second text in a distinct second language, where the second text represents a translation of the first text into the second language or the first text represents a translation of the second text into the first language. Second user input to the GUI is received providing an alternate translation of the first text to the second text or the second text to the first text.

28 Claims, 9 Drawing Sheets

(56) References Cited

OTHER PUBLICATIONS

Application for U.S. Appl. No. 60/774,790, entitled "Encoding and Adaptive, Scalable Accessing of Distributed Models," filed Feb. 17, 2006, 81 pages.

Application for U.S. Appl. No. 60/775,570, entitled "Encoding and Adaptive, Scalable Accessing of Distributed Models," filed Feb. 21, 2006, 85 pages.

Google Language Tools, Ó2007, [online], Retrieved from the Internet: http://www.google.com/language_tools, 4 pages.

Huntersoft, [online], [retrieved Jul. 25, 2008], Retrieved from the Internet: <URL: http://web.archive.org/web/20070106052524/http://www.zhangduo.com/translatorhtml>, 5 pages.

Screenshot of Translated Version of http://news.google.ru/, 1 page, [online], Retrieved from the Internet on Feb. 14, 2007.

International Search Report and Written Opinion for PCT Application No. PCT/US2008/053741, dated Aug. 11, 2008, 16 pages.

International Preliminary Report on Patentability for PCT Application No. PCT/US2008/053741, dated Aug. 27, 2009, 10 pages.

* cited by examiner

MACHINE TRANSLATION FEEDBACK

CROSS-REFERENCE TO RELATED APPLICATIONS

This application is a continuation of U.S. patent application Ser. No. 13/185,425 filed on Jul. 18, 2011, which is a continuation of U.S. patent application Ser. No. 11/675,034 filed on Feb. 14, 2007, now U.S. Pat. No. 7,983,897. The entire disclosures of each of the above applications are incorporated herein by reference.

BACKGROUND

Translation from one human language (a source language) to another human language (a target language) can be done in various ways. Machine translation uses computers to automate part of or the entire translation process. Many websites on the Internet provide machine translation to allow for easy access to information in different languages. Rule-based machine translation and statistical machine translation are two examples of machine translation systems (MTS's). Such websites usually do not provide a means for users to easily provide feedback on the translation quality, however. If users find a translation to be incorrect or culturally offensive, for example, typically their only resort is to send an email message to the website operator who may or may not route the message to the appropriate person. In addition, the message might omit the source language version of the text, the translation at issue, or a corrected version of the translation. This makes it exceedingly difficult to analyze translation errors and improve the quality of machine translation based on user feedback.

SUMMARY

In general, one aspect of the subject matter described in this specification can be embodied in a method that includes a method for first receiving an indication of when a user-manipulable cursor is positioned in proximity to a first presentation of first text in a graphical user interface (GUI), the first text being in a first language. In response to the first receiving, causing a second presentation in the GUI of second text in a distinct second language, where the second text represents a translation of the first text into the second language or the first text represents a translation of the second text into the first language. Second user input to the GUI is received providing an alternate translation of the first text to the second text or the second text to the first text. Other implementations of this aspect include corresponding systems, apparatus, and computer program products.

These and other implementations can optionally include one or more of the following features. If the alternate translation is determined to be SPAM and it is discarded, where determining includes deciding if the alternate translation is one or more of: empty, the same as the first text or the second text, has a low probability of occurrence in the first language or the second language, contains an obscene word, or was submitted by a user who is suspect. The first text, the second text, and the alternate translation are automatically provided to a human reviewer. The first text, the second text, and the alternate translation are automatically provided to a community review process. The first text is identified by examining text represented in the first presentation that is in proximity to the cursor. The first text represents a subset of the text in the first presentation. The first text is a sentence. The second presentation overlays the first presentation in the GUI. A third presentation is displayed in the GUI which includes one or more previously provided alternate translations.

In general, one aspect of the subject matter described in this specification can be embodied in a method that includes receiving an indication of when a user-manipulable cursor is positioned in proximity to a first presentation of first text in a graphical user interface (GUI), the first text being in a first language. In response to the receiving, causing a second presentation in the GUI of second text in a distinct second language, where the second text represents a translation of the first text into the second language or the first text represents a translation of the second text into the first language. User input to the GUI is received providing feedback pertaining to the translation of the first text to the second text or the second text to the first text, where the feedback is one of: a rating, selection of an alternate translation, or an indication of whether the translation is inappropriate. Other implementations of this aspect include corresponding systems, apparatus, and computer program products.

These and other implementations can optionally include one or more of the following features: determining if the alternate translation is one or more of: empty, the same as the first text or the second text, has a low probability of occurrence in the first language or the second language, contains an obscene word, or was submitted by a user who is suspect.

Particular implementations of the subject matter described in this specification can be implemented to realize one or more of the following advantages. Text is automatically selected based on the location of a cursor. A translation feedback window for the selected text is automatically displayed. Users can easily compare a translated portion of selected text with corresponding text in a source language and submit an alternate (better) translation if necessary. Along with the user provided alternate translation, the source text and the original translation are automatically included with the user feedback. Addition information can also be automatically included with the feedback to further aid analysis of the machine translation error. User provided alternate translations are automatically analyzed to determine if they are SPAM and, if so, they are discarded. User feedback is automatically routed to the appropriate parties for individual or community review. Even monolingual speakers can submit alternate translations if the surrounding context of the translation makes it clear that there is an error. User translation feedback is enabled for an entire translated document or merely a fragment of translated text. User feedback collection is not disruptive to the user's reading experience. The technique for obtaining feedback can be implemented with the languages reversed.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
FIG. 1A is an illustration of a webpage that has been translated from Russian to English.

FIG. 1A illustrates a rendering or "presentation" of an electronic document 100 in a graphical user interface (GUI). Generally speaking, an electronic document or "document" contains text in at least one human language. A document can be a hypertext markup language document (HTML), an eXtensible Markup Language (XML) document, or a word processing document, for example. Some documents contain content in addition to text such as images and other data, including embedded content. Moreover, a document does not necessarily correspond to a file. A document may be stored in a portion of a file that holds other documents, in a single file dedicated to the document in question, or in multiple coordinated files. Documents can be stored in memory without having first been stored in a file.

A GUI is capable of presenting a document's text on a display device such as a computer monitor or other display. Web browsers such as Mozilla Firefox which are capable of presenting documents on display devices utilize GUI libraries integrated into host operating systems (e.g., Microsoft Windows, available from Microsoft Corporation of Redmond, Wash. and Mac OS X, available from Apple Inc. of Cupertino, Calif.). GUIs typically include functionality to allow users to interactively manipulate document presentations. GUIs are provided on most consumer computer devices such as personal computers, mobile phones, personal digital assistances, digital media players, electronic gaming devices, and electronic book readers. The techniques for obtaining user translation feedback described herein are applicable to all such devices. Moreover, these techniques can be used in combination with a wide variety of software applications including, but not limited to, web browsers, word processors, document reading software, and other applications which display text.

Figure 1B:
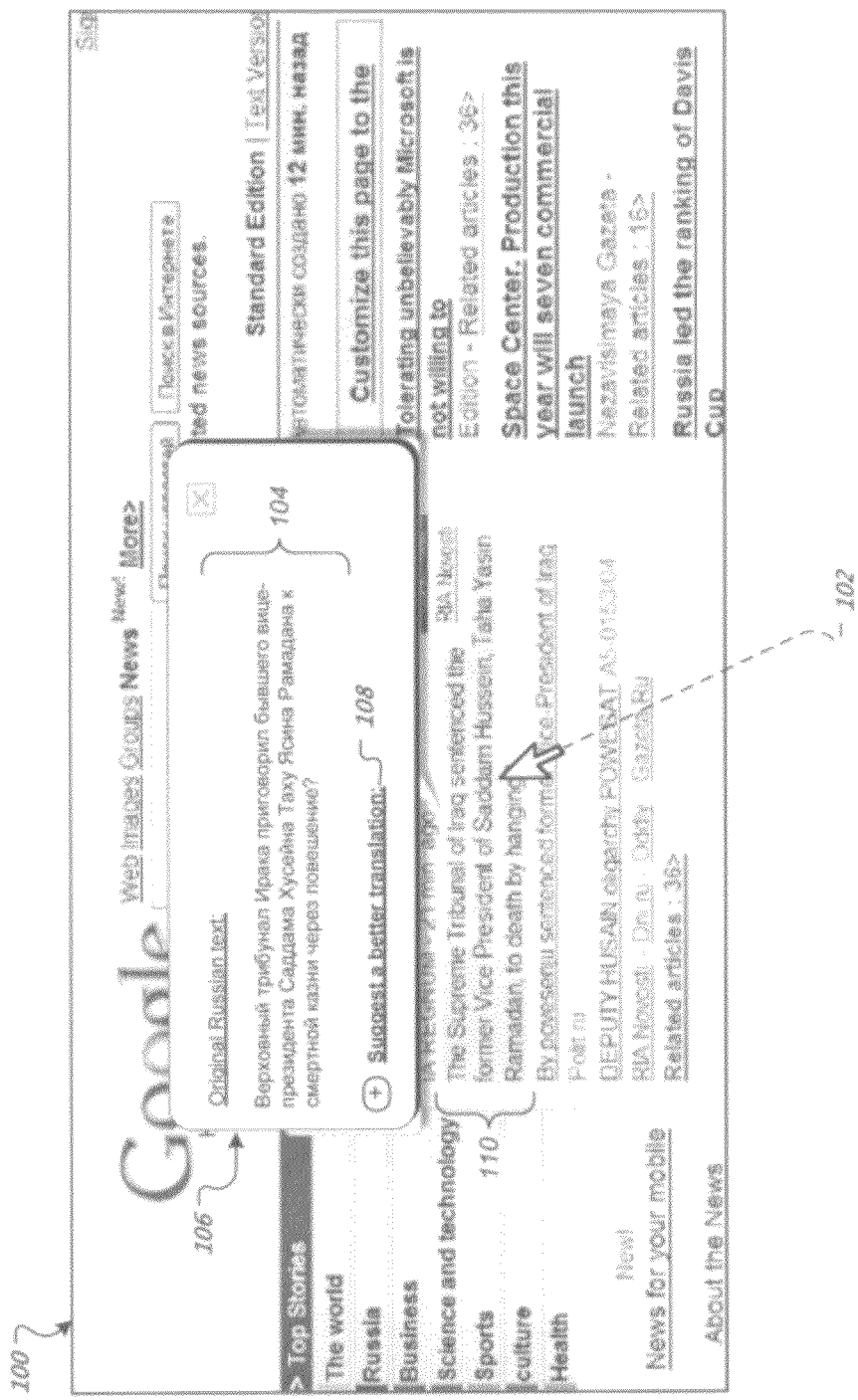
FIG. 1B is an illustration of a translation feedback window.

Users interact with the presentation of a document (e.g., 100) in a GUI by using an input device such as a mouse or other suitable device. The input device has a visual representation (e.g., 102) or "cursor" on the display device that allows users to select text in the presentation. Users can position the cursor 102 over a section of the presentation 100. Text 110 that is in proximity to the mouse cursor 102 is automatically selected, as shown in FIG. 1B. In various implementations, the selected text can is automatically highlighted in the presentation 100. In some implementations, text deemed to be within the proximity of the cursor 102 is the sentence that is beneath the cursor's 102 hotspot. In other implementations, the selected text is the paragraph beneath the cursor's 102 hotspot. In yet further implementations, the selected text is text within a predetermined or dynamically determined region surrounding the cursor's 102 hotspot and is delimited on word, sentence or paragraph boundaries.

A document contains source text in a source language. A document's source text can be automatically translated by a MTS to a target language. For example, the document presentation 100 is an English language translation of a Russian language news web page. In various implementations, such a translation is accomplished by using a MTS such as Google Translate, available from Google Inc., of Mountain View, Calif. However, other MTSs can be used. Google Translate can translate an arbitrary amount of text, including an entire webpage, from a source language (e.g., Chinese, Japanese, Korean and Vietnamese) to a target language (e.g., English, French, Russian). By way of illustration, users can enter the uniform resource locator (URL) of the webpage they wish translated into a text field on the Google Translate webpage and then select the source and target languages. Google Translate uses a MTS to translate the visible text in the webpage from the source language to the target language. The user's browser is then redirected to a translated version of the webpage.

A translation feedback window 106 is automatically presented in the GUI when users position the cursor 102 over the text (e.g., 110) of a document. The feedback window 106 is displayed over the document presentation 100 and near the cursor 102, for instance, or the feedback window 106 can be incorporated into another portion of the GUI such that the document presentation 100 is not obscured. If the presentation 100 is of translated text (in a target language), the feedback window 202 displays the corresponding source text (in a source language) in feedback window region 104. Alternatively, if the presentation 100 is of a document's source text, the feedback window region 104 displays a translation of the selected text 110 into a target language. In a further alternative, instead of displaying a feedback window 106, the text that would be displayed in region 104 instead replaces the selected text 110 in the presentation 100 if the cursor 102 hovers on the selected text 110 for a predetermined time period. The selected text 110 is automatically changed back when the cursor is moved away from the selected text 110.

Figure 1C:
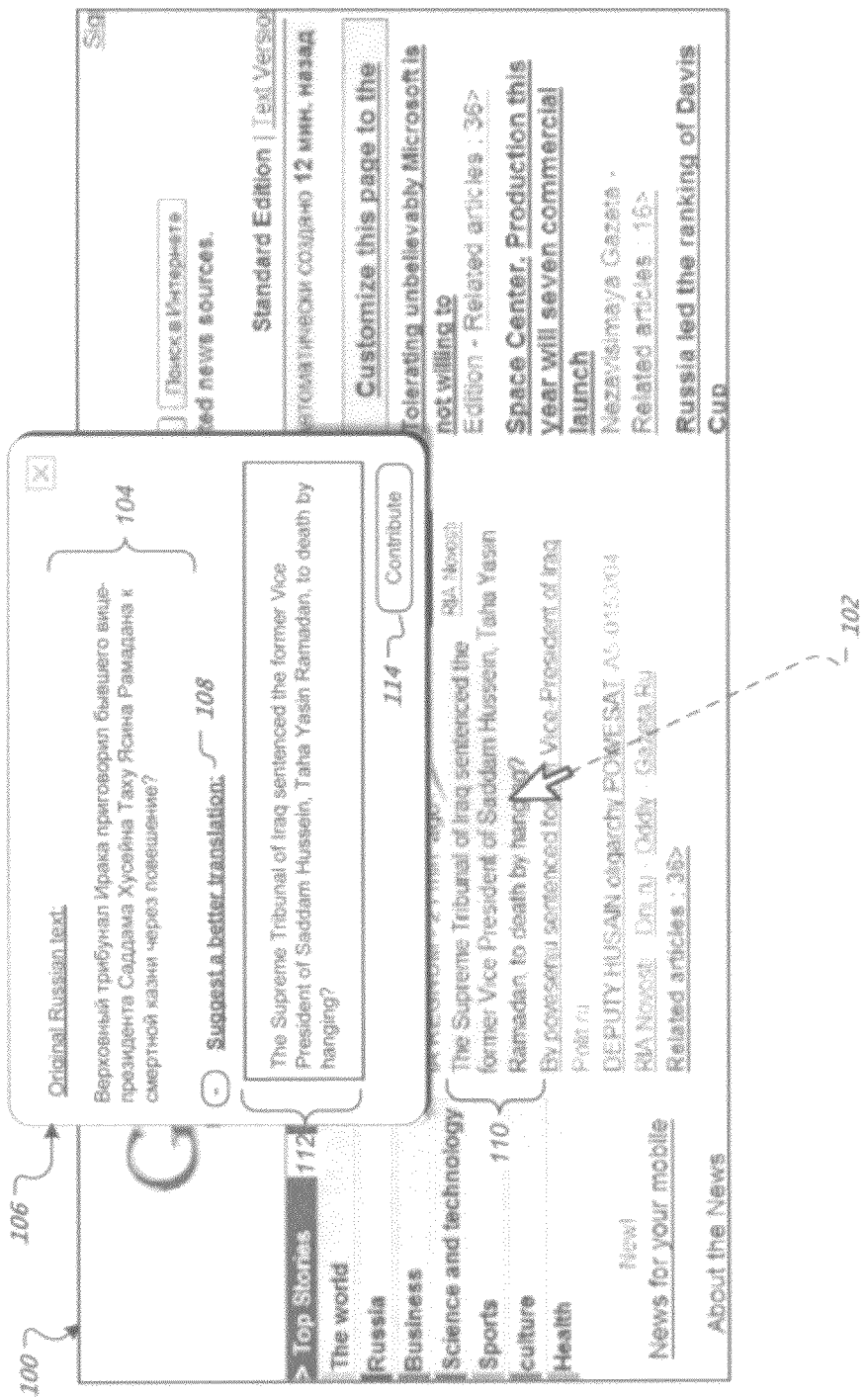
FIG. 1C is an illustration of a user-provided alternate translation.

Users may find that a given translation as shown in the presentation 100 or in the feedback window 106 is incorrect. The feedback window 106 enables users to provide suggestions for alternate translations. By selecting the "Suggest a better translation" link 108, a text entry region 112 is opened in the feedback window 106 (as shown in FIG. 1C) into which the user can enter an alternate translation. In some implementations, the text entry region 112 is pre-populated with text that the user can edit. If the presentation 100 is of translated text, the text entry region 112 is pre-populated with the selected text 110. Otherwise, the text entry region 112 is pre-populated with the selected text 110 translated into a target language. Users can edit the text or replace it entirely. Users select the "contribute" button 114 to submit their alternate translation to a translation feedback system, which is described below. In addition to the alternate translation, the feedback automatically includes the source text in the source language and the translation of the source text to the target language.

Figure 2A:
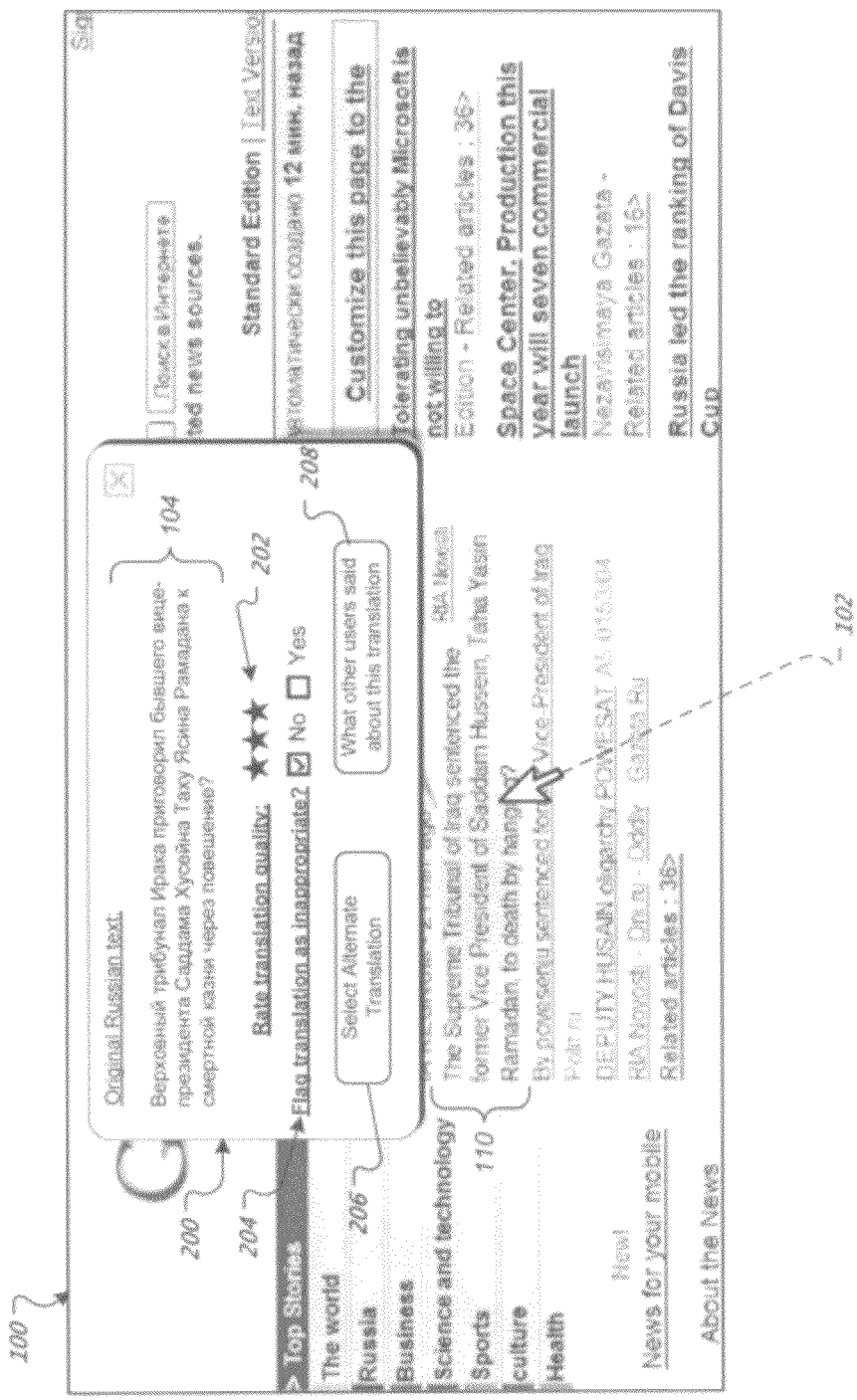
FIG. 2A is an illustration of another translation feedback window.

FIG. 2A is an illustration of another feedback window 200 through which users can provide other types feedback. As before, if the presentation 100 is of translated text, the region 104 displays the corresponding source text. Alternatively, if the presentation 100 is of a document's source text, the region 104 displays a translation of the selected text 110 into a target language. Users are given the opportunity to rate the quality, correctness or usefulness of the translation using, for instance, a star rating 202 or other scoring mechanism. For example, a translation which receives five stars is considered excellent whereas a translation which receives one star is considered unacceptable. Alternatively, or in addition to a rating, users can submit written comments on the translation quality. A GUI button 208 (or other GUI element) allows users to view ratings from other users, including their comments, as shown in window region 212 in FIG. 2B. In further implementations, users can also flag a translation as being culturally inappropriate using a simple GUI checkbox 204 (FIG. 2A) or other GUI element.

Figure 2B:
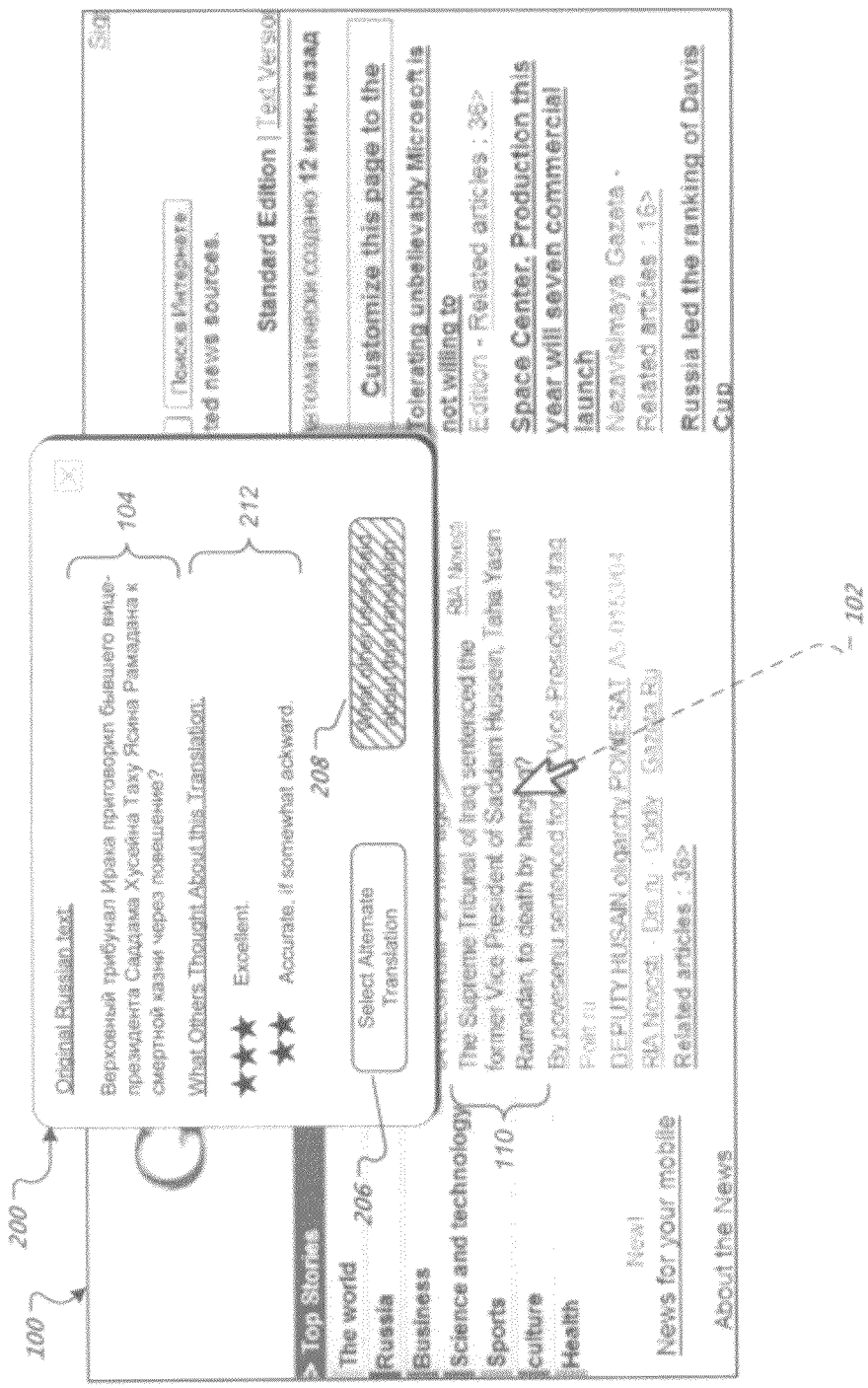
FIG. 2B is an illustration of a ratings feedback window.
Figure 2C:
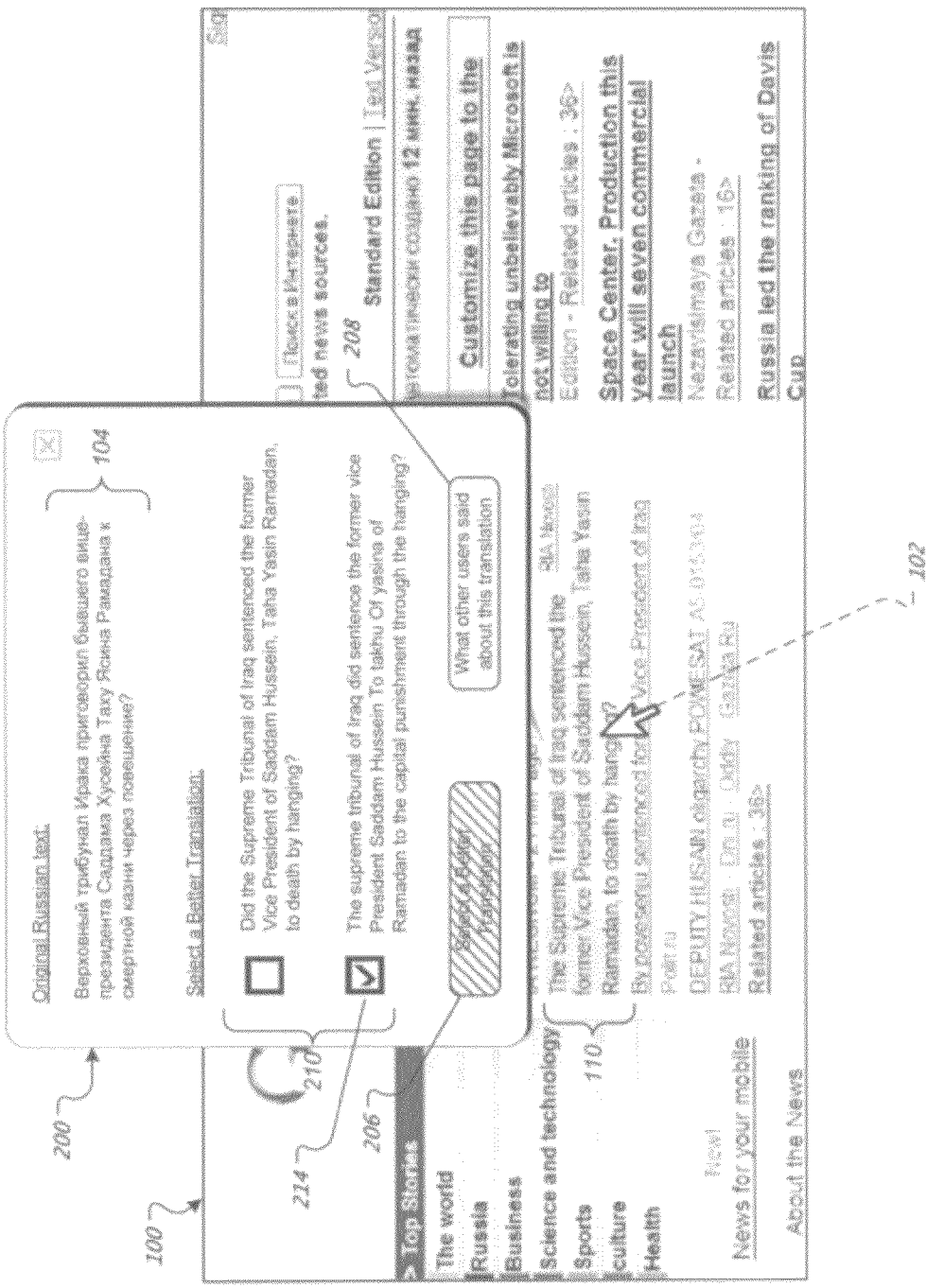
FIG. 2C is an illustration of a translation selection window.

With reference to FIG. 2C, the feedback window 200 allows users to review alternate translations considered by a MTS for the selected text 110, alternate translations submitted by other users (e.g., as shown in FIG. 1C), or combinations of these, and pick one which they believe is better than the current translation. Users select the "Select Alternate Translation" button 206 (or other GUI element) which causes the list of alternate translations 210 to be displayed, as shown in FIG. 2C. Users can choose a better translation by selecting a checkbox (e.g., 214) or other GUI element. If the MTS is a statistical system, the list 210 can include top translation possibilities that scored below the current translation.

The additional feedback described in reference to FIGS. 2A, 2B and 2C is automatically provided to the translation feedback system and includes the source text in the source language and the translation of the source text in the target language. In addition, the feedback can include other information relating to the state of the MTS when the translation was performed such as, for instance, alternate translations the MTS considered but did not elect for the selected text 110. All of this information can be used to improve the quality of the MTS.

Figure 3:
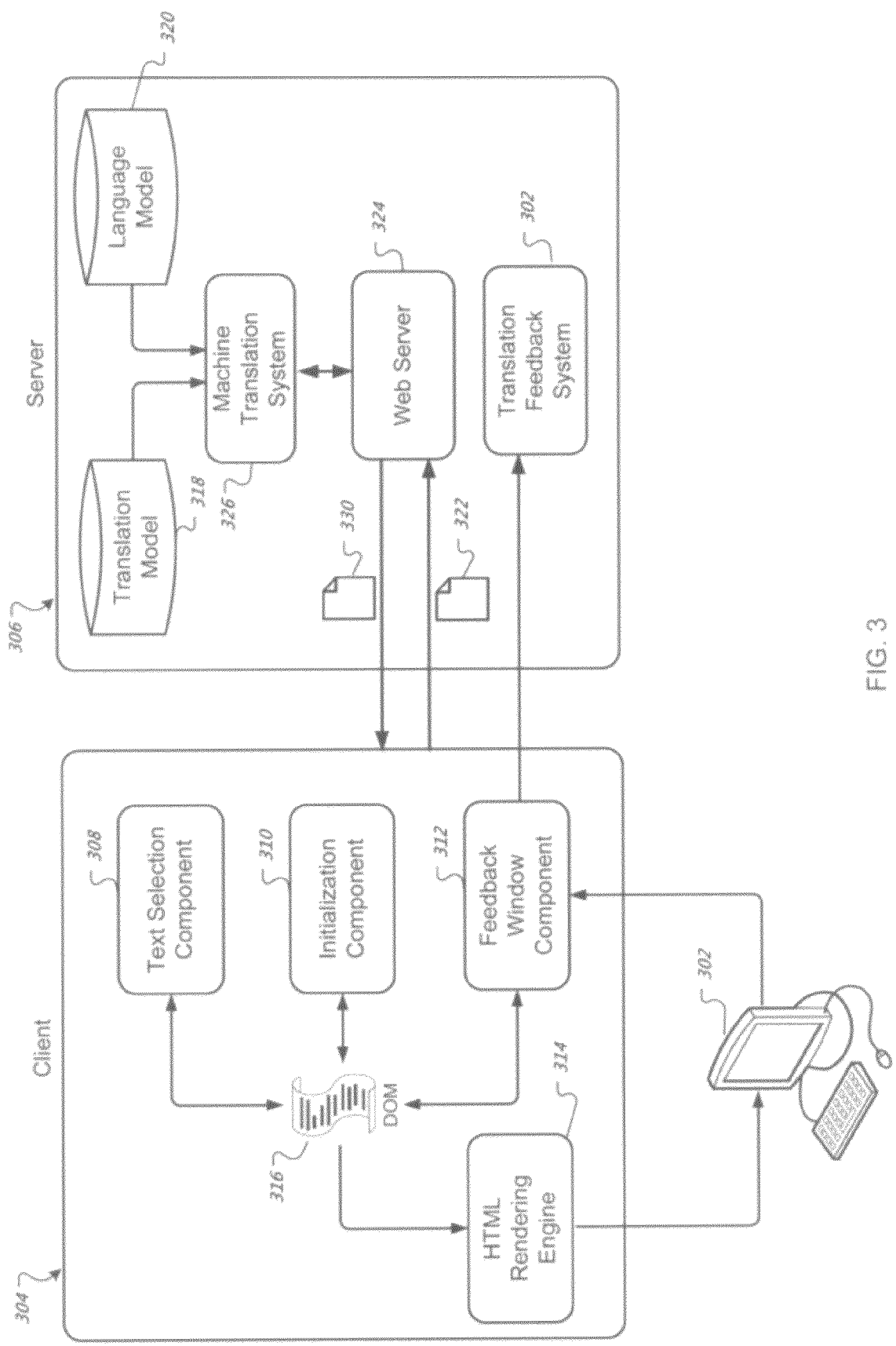
FIG. 3 is a schematic diagram of a system for obtaining user translation feedback.

FIG. 3 is a schematic diagram of a system for obtaining user feedback of a machine translation. A client 304 (e.g., a web browser or other application) and a server 306 each include components that may reside on the same or on different computing devices connected by one or more networks (e.g., the Internet) such as personal computers, mobile phones, workstations, servers, and other suitable devices. Moreover, there may be fewer or more components than illustrated. In various implementations, users submit a document or a reference to a document (e.g., a URL for a web page) 322 to a MTS 326 through a web portal (e.g., Google Translate) served by a web server 324. The web server 324 fetches the document 322 and provides it to the MTS 326. The MTS 326 translates the document's text in a source language to a target language on behalf of the web server 324.

By way of illustration, the MTS 326 can be rules-based or statistical. In the case of a statistical MTS, translation is learned from previously translated texts. A language model 320 provides probabilities of words and word combinations occurring in a target language to the MTS 326. A translation model 318 provides probabilities that a given word or combination of words in a source language are translated into one or more words in a target language. The MTS 326 translates text by looking at adjacent sequences of one or more words in a source text to find the most probably translation of the text in the translation model 318. The language model 320 is used to ensure fluency by demoting possible translations that have words or word combinations with a low probability of occurrence in the target language.

The web server 324 provides the translated web page 330 to the client 304. In some implementations, the translated web page 330 includes the original source text in the source language which is not visible when the web page is rendered by the client 304 (e.g., the original source text is marked as hidden). Alternatively, the web server 324 provides the web page 330 to the client 304 such that the original source text is visible and the translated text will not be visible when the web page is rendered by the client 305. The client processes the web page 330 by populating a Document Object Model (DOM) 316 with a representation of the web page 330. A DOM is a representation of a structured document such as an HTML document. The DOM is used by the rendering engine 315 to present the document on a display device 302.

In addition to the web page 330, or as part of it, the web server 324 provides a text selection component 308, an initialization component 310, and a feedback window component 312. Alternatively, these components are already resident in the client 304. The components 308, 310 and 312 are comprised of JavaScript code (or code in another programming language) that is executed by the client 304 as part of presenting the web page 330 on the display device 302. The initialization component 310 sets up event handlers and timers for the text selection component 308 and the feedback window component 312, respectively. The text selection component 308 is invoked when the cursor (e.g., 102) is moved over text which has been translated and automatically selects (and highlights) the text in proximity to the cursor (e.g., 110) by changing the selected text's properties in the DOM 316.

If the cursor remains over the selected text for a predetermined period of time, the feedback window component 312 causes the presentation of a feedback window (e.g., 106 or 200) in proximity to the cursor. The feedback window component pre-populates the window with original source text or translated text corresponding to the selected text. This text can be obtained from the DOM 316 (e.g., the hidden text) or can be obtained by making a request to the web server 324. If the user submits feedback through the feedback window, the feedback window component 312 transmits the information to a translation feedback system 302 which will be described with reference to FIG. 4. The feedback information includes the source text, the translated text, and optionally other information such as the state of the MTS when the translation of the selected text occurred. MTS state information can be encoded in the web page 330 as hidden information or obtained by making a request to the web server 324.

Figure 4:
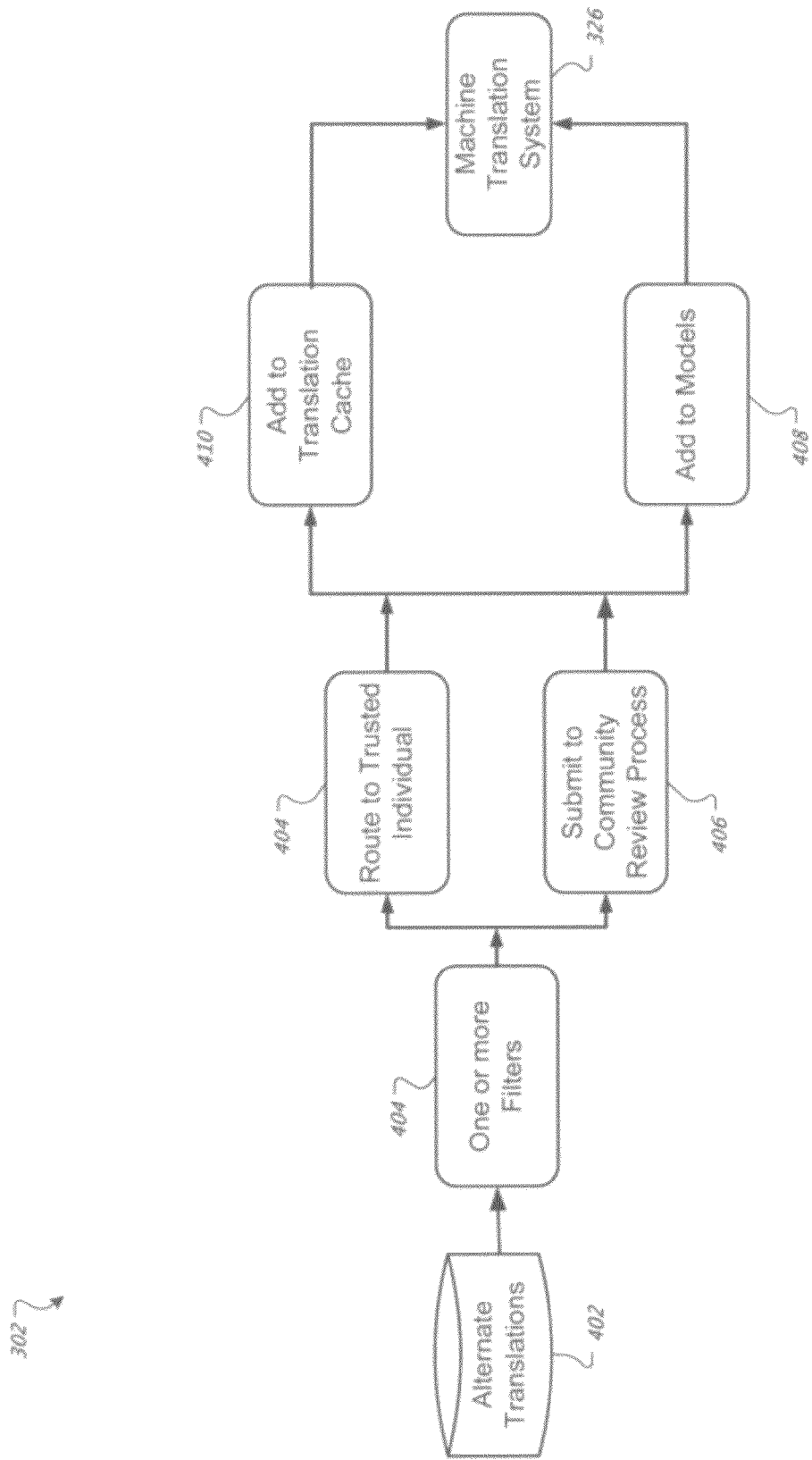
FIG. 4 is a schematic diagram of a system for routing user translation feedback.

FIG. 4 is a schematic diagram of the translation feedback system 302. When user feedback is received by the system 302, the feedback is initially stored in a translation store 402. Unsolicited, incomplete, irrelevant, or inappropriate user feedback (so-called "SPAM") is filtered out of the system 302 by a filter component 404. The filter component 404 characterizes user-provided alternate translations as SPAM if one or more of the following conditions are true:

The alternate translation is empty or unchanged from the original translation;
The alternate translation contains obscene language;
The same user is suspect: the user has submitted more than a given number of alternate translation within a given time period or the user has a history of submitting SPAM;
According to the MTS, the alternate translation has a low probability of occurrence in the target language; or
The alternate translation contains redundant words.

Other filters are possible, including a filter that automatically corrects misspellings in the alternate translation. Alternate translations that are not filtered out as are automatically routed to a trusted individual 404 to evaluate the alternate translation or to a community review process 406 which allows individuals to vote on whether they approve of the alternate translation. Since the alternate translation is accompanied by the original source text and the translated text, the person(s) reviewing the feedback have complete information in which to make a judgment. In various implementations, if the alternate translation is approved the alternate translation can be added to a translation cache for the MTS 326 such that the alternate translation is henceforth used instead of the original translation. Alternatively, the alternate translation can be used to further train the MTS 326 by incorporating the alternate translation into the language model 320 and the translation model 318.

Figure 5:
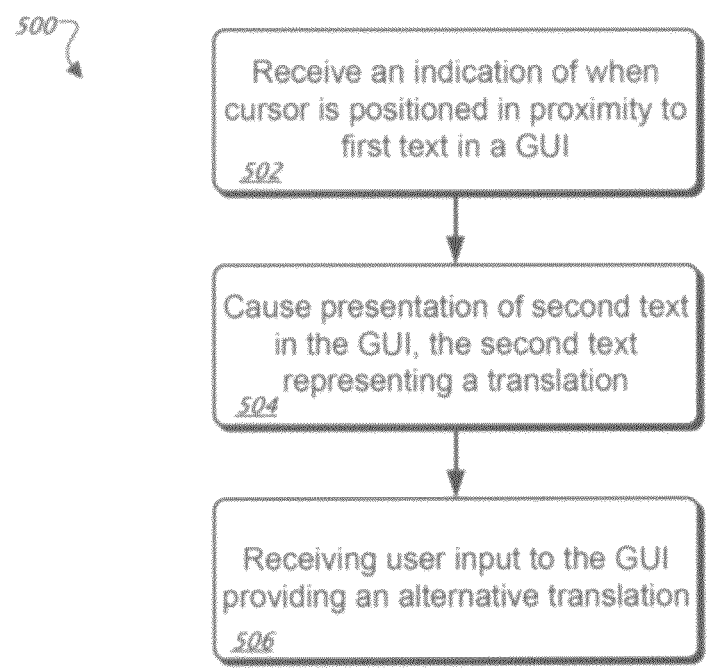
FIG. 5 shows a flowchart for obtaining user translation feedback.

FIG. 5 is a flowchart 500 illustrating a method for obtaining an alternate translation from a user. An indication of when a user-manipulable cursor (e.g., cursor 102) is positioned in proximity to a first presentation of first text (e.g., 100) in a GUI is received, the first text being in a first language (step 502). A second presentation (e.g., feedback window 106) in the GUI of second text in a distinct second language is displayed (step 504). The second text represents a translation of the first text into the second language or the first text represents a translation of the second text into the first language. Finally, user input to the GUI is received providing an alternate translation of the first text to the second text or the second text to the first text (step 506).

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method, comprising:
    receiving, at a computing device having one or more processors, one or more words in a first language to be translated to a second language;
    obtaining, at the computing device, translated text based on the one or more words, a translation model, and a language model, the translated text being a translation of the one or more words from the first language to the second language;
    providing, from the computing device, a graphical user interface (GUI) for display at a display device, the GUI including the one or more words in the first language and the translated text;
    receiving, at the computing device, user input indicating a specific alternate translation of the one or more words;
    analyzing, at the computing device, the user input to determine whether the user input is SPAM;
    when the user input is not SPAM, providing, from the computing device, the user input to a translation feedback system to update the language model and the translation model based on the user input; and
    when the user input is SPAM, discarding the user input.

2. The computer-implemented method of claim 1, wherein analyzing the user input to determine whether the user input is SPAM comprises determining whether the user input is duplicative of the translated text, the user input being characterized as SPAM when the user input is duplicative of the translated text.

3. The computer-implemented method of claim 1, wherein analyzing the user input to determine whether the user input is SPAM comprises determining whether the user input contains no text, the user input being characterized as SPAM when the user input contains no text.

4. The computer-implemented method of claim 1, wherein analyzing the user input to determine whether the user input is SPAM comprises determining whether the user input contains obscene words, the user input being characterized as SPAM when the user input contains obscene words.

5. The computer-implemented method of claim 1, wherein analyzing the user input to determine whether the user input is SPAM comprises determining whether a user providing the user input has previously submitted more than a specific number of submissions during a specific time period, the user input being characterized as SPAM when the user has provided more than the specific number of submissions during the specific time period.

6. The computer-implemented method of claim 1, wherein analyzing the user input to determine whether the user input is SPAM comprises determining whether the user input has a low probability of occurrence in the second language based on the language model, the user input being characterized as SPAM when the user input has the low probability of occurrence in the second language.

7. The computer-implemented method of claim 1, wherein analyzing the user input to determine whether the user input is SPAM comprises determining whether the user input contains at least one redundant word in the second language, the user input being characterized as SPAM when the user input contains at least one redundant word.

8. The computer-implemented method of claim 1, wherein the GUI further includes a list of possible alternate translations, the user input comprises a selection of the specific alternate translation from the list of possible alternate translations, and the user input further indicates a ranking of the specific alternate translation.

9. The computer-implemented method of claim 1, wherein the GUI includes an input field that receives the user input.

10. The computer-implemented method of claim 1, further comprising correcting, at the computing device, a misspelling in the user input to obtain the specific alternate translation.

11. A computing system, comprising:
    a non-transitory computer-readable storage medium storing executable computer program code; and
    at least one processor configured to execute the executable computer program code to perform operations including:
    receiving one or more words in a first language to be translated to a second language,
    obtaining translated text based on the one or more words, a translation model, and a language model, the translated text being a translation of the one or more words from the first language to the second language,
    providing a graphical user interface (GUI) for display at a display device, the GUI including the one or more words in the first language and the translated text,
    receiving user input indicating a specific alternate translation of the one or more words,
    analyzing the user input to determine whether the user input is SPAM;
    when the user input is not SPAM, providing the user input to a translation feedback system to update the language model and the translation model based on the user input, and
    when the user input is SPAM, discarding the user input.

12. The computing system of claim 11, wherein analyzing the user input to determine whether the user input is SPAM comprises determining whether the user input is duplicative of the translated text, the user input being characterized as SPAM when the user input is duplicative of the translated text.

13. The computing system of claim 11, wherein analyzing the user input to determine whether the user input is SPAM comprises determining whether the user input contains no text, the user input being characterized as SPAM when the user input contains no text.

14. The computing system of claim 11, wherein analyzing the user input to determine whether the user input is SPAM comprises determining whether the user input contains obscene words, the user input being characterized as SPAM when the user input contains obscene words.

15. The computing system of claim 11, wherein analyzing the user input to determine whether the user input is SPAM comprises determining whether a user providing the user input has previously submitted more than a specific number of submissions during a specific time period, the user input being characterized as SPAM when the user has provided more than the specific number of submissions during the specific time period.

16. The computing system of claim 11, wherein analyzing the user input to determine whether the user input is SPAM comprises determining whether the user input has a low probability of occurrence in the second language based on the language model, the user input being characterized as SPAM when the user input has the low probability of occurrence in the second language.

17. The computing system of claim 11, wherein analyzing the user input to determine whether the user input is SPAM comprises determining whether the user input contains at least one redundant word in the second language, the user input being characterized as SPAM when the user input contains at least one redundant word.

18. The computing system of claim 11, wherein the GUI further includes a list of possible alternate translations, the user input comprises a selection of the specific alternate translation from the list of possible alternate translations, and the user input further indicates a ranking of the specific alternate translation.

19. The computing system of claim 11, wherein the operations further include correcting a misspelling in the user input to obtain the specific alternate translation.

20. A computer-implemented method, comprising:
receiving, at a computing device having one or more processors, one or more words in a first language to be translated to a second language;
obtaining, at the computing device, a set of possible translations of the one or more words based on a translation model and a language model, the set of possible translations including at least one translation of the one or more words from the first language to the second language;
providing, from the computing device, a graphical user interface (GUI) for display at a display device, the GUI including the one or more words in the first language and the set of possible translations of the one or more words;
receiving, at the computing device, user input including a selection of a specific alternate translation from the set of possible alternate translations and a ranking of the specific alternate translation
analyzing, at the computing device, the user input to determine whether the user input is SPAM;
when the user input is not SPAM, providing, from the computing device, the user input to a translation feedback system to update the language model and the translation model based on the user input; and
when the user input is SPAM, discarding the user input.

21. A computer-implemented method, comprising:
receiving, at a computing device having one or more processors, one or more words in a first language to be translated to a second language;
obtaining, at the computing device, translated text based on the one or more words, a translation model, and a language model, the translated text being a translation of the one or more words from the first language to the second language;
providing, from the computing device, a graphical user interface (GUI) for display at a display device, the GUI including the one or more words in the first language and the translated text;
receiving, at the computing device, user input indicating a specific alternate translation of the one or more words;
analyzing, at the computing device, the user input to determine whether the user input is SPAM;
when the user input is not SPAM, providing, from the computing device, the user input to a translation feedback system to update at least one of the language model and the translation model based on the user input; and
when the user input is SPAM, discarding the user input.

22. The computer-implemented method of claim 21, wherein analyzing the user input to determine whether the user input is SPAM comprises determining whether the user input is duplicative of the translated text, the user input being characterized as SPAM when the user input is duplicative of the translated text.

23. The computer-implemented method of claim 21, wherein analyzing the user input to determine whether the user input is SPAM comprises determining whether the user input contains no text, the user input being characterized as SPAM when the user input contains no text.

24. The computer-implemented method of claim 21, wherein analyzing the user input to determine whether the user input is SPAM comprises determining whether the user input contains obscene words, the user input being characterized as SPAM when the user input contains obscene words.

25. The computer-implemented method of claim 21, wherein analyzing the user input to determine whether the user input is SPAM comprises determining whether a user providing the user input has previously submitted more than a specific number of submissions during a specific time period, the user input being characterized as SPAM when the user has provided more than the specific number of submissions during the specific time period.

26. The computer-implemented method of claim 21, wherein analyzing the user input to determine whether the user input is SPAM comprises determining whether the user input has a low probability of occurrence in the second language based on the language model, the user input being characterized as SPAM when the user input has the low probability of occurrence in the second language.

27. The computer-implemented method of claim 21, wherein analyzing the user input to determine whether the user input is SPAM comprises determining whether the user input contains at least one redundant word in the second language, the user input being characterized as SPAM when the user input contains at least one redundant word.

28. The computer-implemented method of claim 21, wherein the GUI further includes a list of possible alternate translations, the user input comprises a selection of the specific alternate translation from the list of possible alternate translations, and the user input further indicates a ranking of the specific alternate translation.

* * * * *